United States Patent
Killian et al.

(10) Patent No.: US 7,999,673 B2
(45) Date of Patent: Aug. 16, 2011

(54) RADIATION DETECTION WITH ENHANCED RFID TAGS

(75) Inventors: Thomas Killian, Westfield, NJ (US); Cynthia Killian, Westfield, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 170 days.

(21) Appl. No.: 11/633,990

(22) Filed: Dec. 5, 2006

(65) Prior Publication Data

US 2008/0129504 A1    Jun. 5, 2008

(51) Int. Cl.
*G08B 13/14* (2006.01)
(52) U.S. Cl. .................................. 340/572.1; 235/375
(58) Field of Classification Search .... 340/572.1–572.9; 235/375–385
See application file for complete search history.

(56) References Cited

U.S. PATENT DOCUMENTS

| | | | |
|---|---|---|---|
| 4,413,327 A * | 11/1983 | Sabo et al. ................... 711/162 |
| 5,339,073 A * | 8/1994 | Dodd et al. ................. 340/5.61 |
| 5,517,188 A * | 5/1996 | Carroll et al. ............... 340/10.52 |
| 6,388,259 B1 * | 5/2002 | Murdock ................. 250/370.01 |
| 7,220,968 B2 * | 5/2007 | Burger et al. ............ 250/370.01 |
| 7,417,540 B2 * | 8/2008 | Johnston et al. ......... 340/539.26 |
| 2002/0047781 A1 * | 4/2002 | Fallah ......................... 340/572.1 |

* cited by examiner

*Primary Examiner* — George A Bugg
*Assistant Examiner* — Edny Labbees

(57) ABSTRACT

An identification tag that is vulnerable to ionizing or non-ionizing radiation and system for determining the presence of radiation based on corrupted or altered memory in the tag is disclosed. An identification tag comprises: a transceiver for receiving an RF signal and transmitting a modulated RF signal; first memory containing a first code for generating the modulated RF signal, the first code being associated with an object for identification; and second memory containing a second code corresponding to a unique identifier for the tag for further modulating the received RF signal, the second memory being specifically vulnerable to ionizing or non-ionizing radiation such that the presence of ionizing or non-ionizing radiation alters or corrupts the second code, wherein the detection of the altered or corrupted code can be employed to indicate the presence of radiation.

18 Claims, 4 Drawing Sheets

RADIATION DETECTION WITH ENHANCED RFID TAGS

FIELD OF THE INVENTION

The present invention relates generally to transponders for tracking items, and more particularly, to a Radio Frequency Identification (RFID) tag that is made specifically vulnerable to damage from radiation.

BACKGROUND OF THE INVENTION

The use of RFID tags for tracking packages, freight, animals and even humans is well known in the art. Passive RFID tags have a relatively short range and operate in frequency ranges from 100 KHz to 3 GHz. Active RFID tags incorporate a power source to increase the scanning range and typically operate in frequency ranges from 15 Mhz to 3 GHz. The power source is utilized to operate the tag's circuitry and to broadcast a signal to a reader. Passive tags have no internal power source. They draw power from an RF signal transmitted by the reader, which sends out electromagnetic waves that induce a current in the antenna of the tag. In a passive RFID tag, the energy of the received signal is converted into power for control, logic and transmit functions. The transponder modulates the RF carrier signal with a unique code when the transponder is disposed in a position within range of a transmitter and the incident signal has a power greater than a predetermined threshold. Semi-passive tags use a battery to run the chip's circuitry, but communicate by drawing power from the reader. Active and semi-passive tags are useful for tracking high-value goods that need to be scanned over long ranges, such as railway cars or in shipment containers.

The read range of passive tags depends on many factors: the frequency of operation, the power of the reader, interference from other RF devices and the like. In general, low-frequency tags are read from a foot (0.33 meter) or less. High-frequency tags are read from about three feet and UHF tags are read from 10 to 20 feet. Where longer ranges are required, an active tag can boost read ranges to as much as 300 feet or more.

An RFID tag contains a unique code stored in memory that is modulated by an external radio frequency (RF) signal to produce a modulated signal that can be used to uniquely identify the object with which the tag is associated by a receiver. The unique code is contained within read-write, read-only, electronically programmable read only (EPROM or EEPROM) or "write once, read many" (WORM). Read-write RFID tags typically have a serial number that can't be overwritten. Additional blocks of data can be used to store additional information about the items to which the tag is attached, and the memory can be locked to prevent overwriting of data. Read-only RFID tags have information stored on them during the manufacturing process, and such data cannot be altered. WORM tags can have a serial number written to them once, and that information cannot be subsequently overwritten.

In a typical RFID tag, measures are taken to mitigate the effects of external radiation. These include transistor sizing and shielding techniques, and the use of redundant circuit elements as is well known in the art. There are applications, however, where it may be desirable to have RFID tags that are vulnerable to radiation.

Containerized shipments entering the United States must be checked for illicit radiological materials. Currently, more than 11 million cargo containers enter U.S. seaports on an annual basis. To confront an ever increasing threat to national security, Customs and Border Protection (CBP) operates radiation portal monitors at seaports, and uses large scale non-intrusive inspection devices to examine cargo. They have also issued hand-held radiation isotope identifier devices and personal radiation detectors for CBP officers working at ports across the country. These efforts, however, are expensive and ultimately impose an economic burden on commerce.

Since all items within a cargo container either already have or can be expected to have a RFID tag in the near future, the vulnerability to damage from ionizing and non-ionizing radiation can be exploited to provide a means to detect the presence of radiation in an efficient and cheap manner.

In view of the above, there is presently a need to provide a new RFID tag that has components that are vulnerable to radiation so that the presence of such radiation can be easily detected.

SUMMARY OF THE INVENTION

In accordance with an aspect of the invention, an identification tag that is vulnerable to ionizing or non-ionizing radiation is disclosed. The identification tag comprises: a transceiver for receiving an RF signal and transmitting a modulated RF signal; first memory containing a first code for generating the modulated RF signal, the first code being associated with an object for identification; and second memory containing a second code corresponding to a unique identifier for the tag for further modulating the received RF signal, the second memory being specifically vulnerable to ionizing or non-ionizing radiation such that the presence of ionizing or non-ionizing radiation alters or corrupts the data representing the second code.

In accordance with another aspect of the invention, a system is provided for detecting the presence of ionizing or non-ionizing radiation in a cargo container housing a plurality of objects, wherein a plurality of identification tags are associated with the objects, each identification tag including memory vulnerable to ionizing or non-ionizing radiation, the memory containing a code corresponding to a unique identifier for the tag. The system comprises: an interrogator for interrogating the identification tags with an RF signal and receiving a modulated RF signal; a database adapted to store a unique identifier for each identification tag; and a processor adapted to communicate with the database and interrogator for detecting and comparing the code stored in the memory of each identification tag with the unique identifier stored in the database. The processor may be coupled to an alarm for indicating the presence of ionizing or non-ionizing radiation when the code of any identification tag among the plurality of identification tags does not match the unique identifier for the identification tag stored in the database due to alteration or corruption of data in the memory of the identification tag. The processor may further be coupled to an apparatus for determining the spatial location of each affected tag within the cargo container to better assist personnel in correlating radiation damaged tags to the items to which they are affixed.

In accordance with yet another aspect of the invention, a method is provided for detecting the presence of ionizing or non-ionizing radiation through an identification tag, which includes memory vulnerable to ionizing or non-ionizing radiation, wherein the memory is programmed to store a code corresponding to a unique identifier for the tag. The method comprises: interrogating the identification tag with an RF signal and receiving a modulated RF signal; detecting and comparing the code stored in the memory of the identification tag with a unique identifier stored in a database; and issuing a radiation alarm if the code initially stored in the memory of an identification tag among the plurality of identification tags does not match the unique code for the identification tag stored in the database.

In accordance with still another aspect of the invention, the interrogator is disposed within the cargo container and communicates with the processor through either a wired or wireless communications link. In this manner, it is possible to inventory the shipping container without opening it or unloading it from a conveyance, such as a ship, on which it is being transported.

These and other advantages of the invention will become apparent to those of ordinary skill in the art by reference to the following detailed description and the accompanying drawings.

DETAILED DESCRIPTION OF THE PREFERRED EMBODIMENT

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
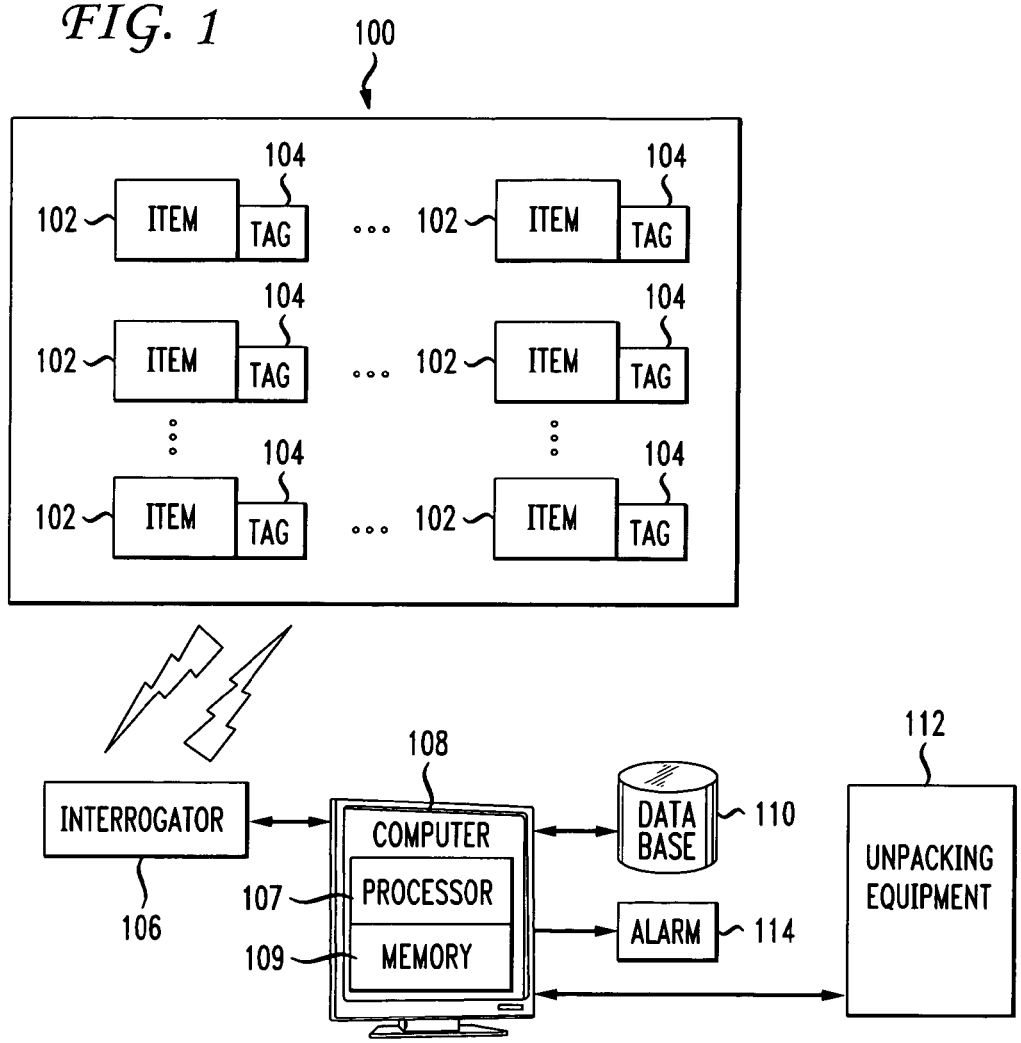
FIG. 1 is a schematic of a shipping container containing a plurality of items with identification tags and a system for practicing aspects of the present invention.

FIG. 1 is a schematic of an environment for practicing aspects of the present invention, including an illustrative containerized shipment comprising a container 100 in which a plurality of items 102 for shipment are contained. Each item 102 has an associated identification tag 104 which uniquely identifies the item 102 in accordance with well-known practices for identifying and tracking articles. Each identification tag 104 is a radio frequency identification (RFID) tag of the type well-known in the art, which has been modified as described in detail below to provide for the ability to detect the presence of radiation (ionizing or non-ionizing) within container 100 and/or among the individual items 102 stored therein. The identification tags 104 are interrogated with RF signals from an interrogator 106 that is coupled to a computer or server ("computer") 108 including a processor 107 and memory 109, communicating with a database 110 as described in more detail below. The containerized shipment is unpacked by packing equipment characterized by the reference numeral 112. The packing equipment 112 has the capability to record the spatial location of the items and associated tags when the shipment is unpacked using known methods to those skilled in the art. These spatial locations can be stored by the computer 108 to enable a record to be maintained of those tags indicating the presence of radiation, and thus potentially suspicious items associated therewith. If radiation is detected, the computer 108 can signal an alarm at 114.

Figure 2:
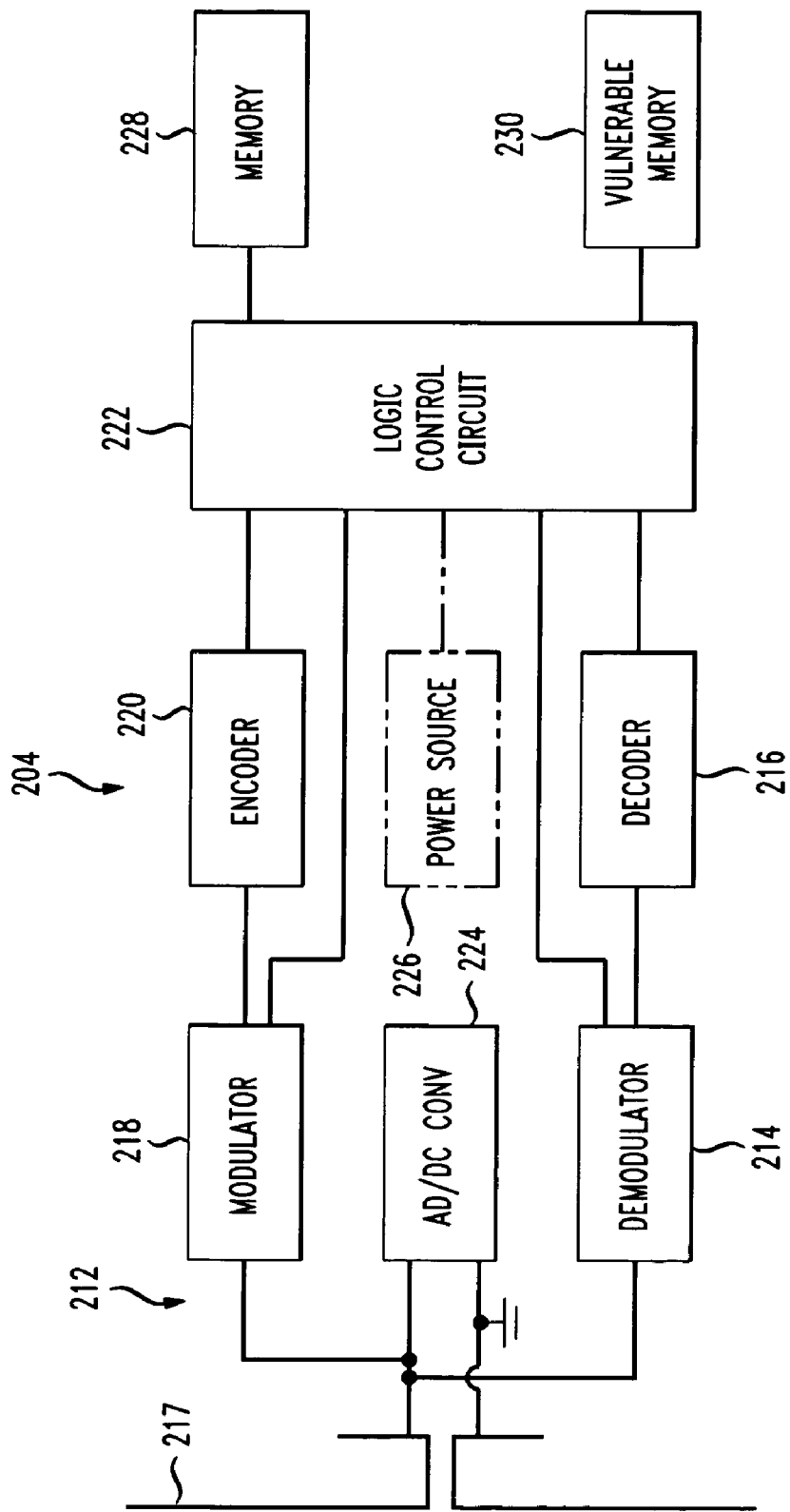
FIG. 2 is a schematic of an illustrative RFID tag in accordance with an aspect of the invention.

FIG. 2 is a schematic of an illustrative identification tag 204 in accordance with an aspect of the invention. Identification tag 204 includes a resonant radio frequency circuit 212 comprising a demodulator 214 and decoder 216 for demodulating an RF signal from an interrogator (106 in FIG. 1) received by an antenna 217, and a modulator 218 and encoder 220 for generating a modulated RF signal and transmitting the modulated RF signal from antenna 217. The demodulator 214, decoder 216, modulator 218 and encoder 220 are coupled to an integrated logic control circuit 222 that provides intelligence for operations of the identification tag. In a passive RFID tag, power is provided by the incident RF signal from the interrogator via an AC/DC converter 224. In an active RFID tag, an optional power source (e.g., a battery) represented by reference numeral 226 is provided to boost the transmit range of the identification tag as is well known in the art. The control circuit 222 communicates with memory 228 for storing identification data corresponding to the item with which the identification tag 204 is associated. The memory 228 may be programmable or static as is known in the art of RFID tag manufacture. An exemplary identification tag 204 includes programmable non-volatile memory for modifying the identification information of an associated item in response to a programming signal from the interrogator as shown, for example, in U.S. Pat. No. 5,517,188, which discloses an arrangement for programming the identification information of an RFID tag after assembly. Regardless of whether the memory 228 is programmed during or subsequent to assembly of the identification tag 204, the data in memory 228 (item identification information) is subjected to error correction to minimize the effects of external electromagnetic interference or radiation.

In accordance with an aspect of the invention, an additional memory 230 is coupled to the control circuit 222 for storing data representing a code corresponding to a unique identifier for the identification tag 204 (not an item associated with the tag). This additional memory is referred to herein as "radiation vulnerable memory" as no precautions are taken to protect any data stored therein. In fact, the vulnerability of data in this unprotected memory is exploited for the invention. This code may comprise any data pattern that matches, for example, a serial number (or other unique identifier) associated with the identification tag. These values are subsequently compared as described in more detail below. Memory 230 may comprise, for example, an electrically erasable programmable read-only memory (EEPROM) of the type well known in the art. The data in memory 230 may be written at the time of manufacture of the identification tag 204, or subsequently programmed using known methods as disclosed, for example, in U.S. Pat. No. 5,517,188. The actual time of, and methods for storing the data in memory 230 is not critical, so long as this data is present in memory 230 prior to placing the items associated with the identification tag in a shipment container.

The control circuit 222 outputs a data stream of stored data from either memory 228 or radiation vulnerable memory 230 when power is supplied in response to an applied RF signal from the interrogator. For the inventive aspect of the identification tag 204, the control circuit 222 modulates the RF signal with the stored data in radiation vulnerable memory 230 to generate a modulated RF signal that is received, demodulated and decoded by the interrogator circuitry such that the data in memory 230 can be externally processed to provide for an indication of the presence of radiation in the container or among the items stored in the container, by comparing the data from memory 230 to the unique identifier for the identification tag 204 in a database (see e.g., 110 in FIG. 1). If the data in memory 230 has been altered or corrupted through the presence of radiation, then the decoded data will not match the stored unique identifier for the identification tag, and a radiation warning can be issued. Advantageously, at low radiation levels, the degree of data corruption (number of altered bits) will be proportional to the radiation flux, which, in the case of a point source of radiation, will in turn be proportional to the square of the distance between the source and the tag; with sufficiently many tags whose spatial locations have been recorded as described above, the positions of multiple radiation sources can be computed using well-known techniques. In particular, radiation emanating from an illicit item can be located, even if said item does not itself have a tag.

Figure 3:
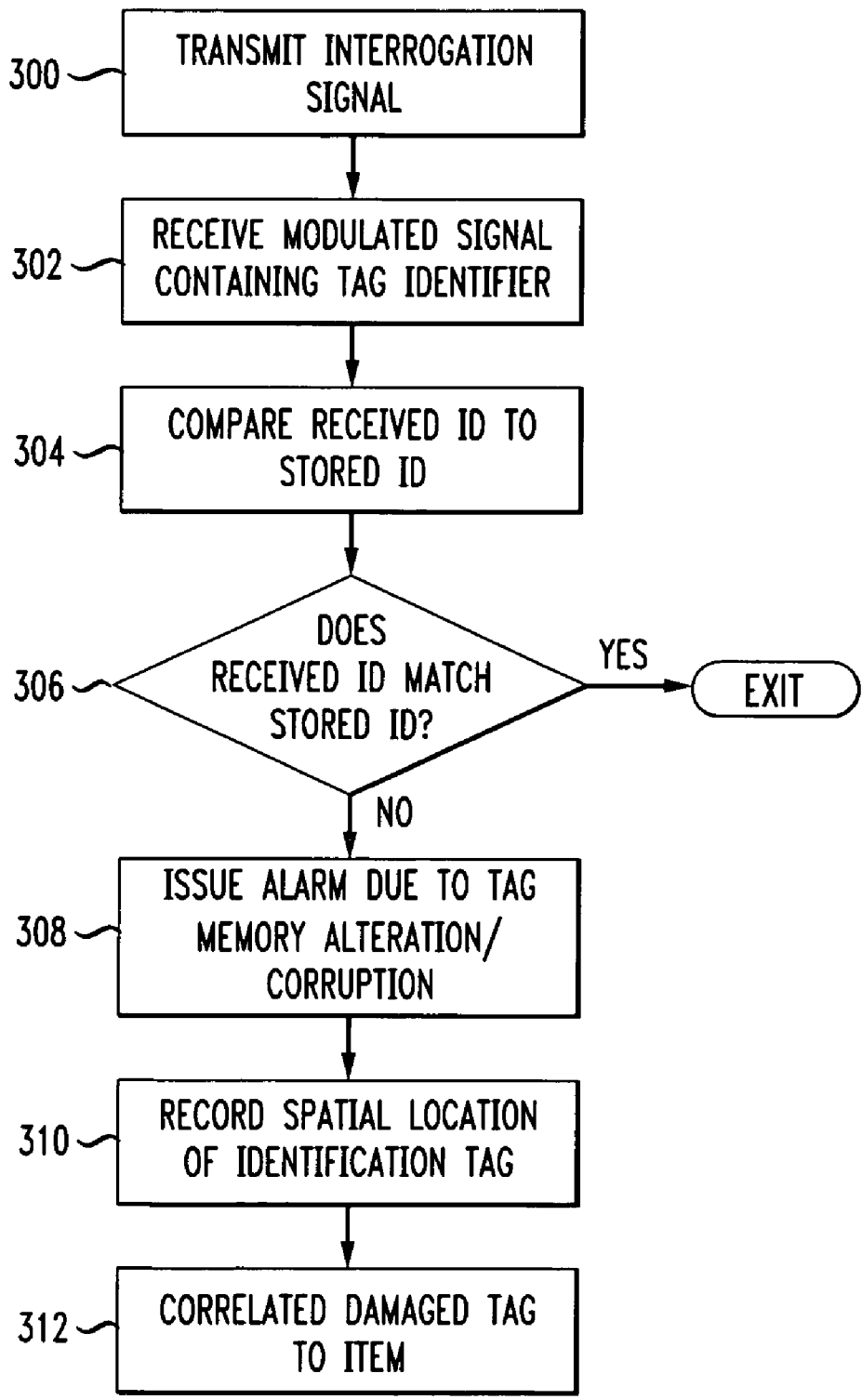
FIG. 3 is a flow diagram of a method in accordance with an aspect of the invention.

Referring now to FIG. 3, there is depicted a flow diagram of an exemplary method in accordance with an aspect of the invention. The method comprises the step 300 of interrogating a shipping container, such as described above, with an RF signal from an interrogator. In step 302, the interrogator receives a responsive RF signal that has been modulated by data representing a code corresponding to a unique identifier for the identification tag. Although the interrogator also receives a modulated signal containing information relating to the item to which the identification tag is attached, this is ignored here as this data is not relevant to the invention. In step 304, the computer compares the tag identifier contained in the received modulated signal to a database containing all identifiers for the tags expected with the shipment. If the received tag identifier does not match the stored identifiers at step 306 due to corruption or alteration of the data in the radiation vulnerable memory, then a radiation alarm can be issued at step 308, indicating the potential presence of radiation within the shipping container. As an option, at step 310, unpacking equipment can record the spatial location within the container of a particular identification tag that has resulted in the issuance of a radiation alarm using known means. This can assist in enabling the appropriate personnel at step 312 to keep a record of a damaged tag(s) and thus a potentially hazardous article(s) to which it is affixed.

Figure 4:
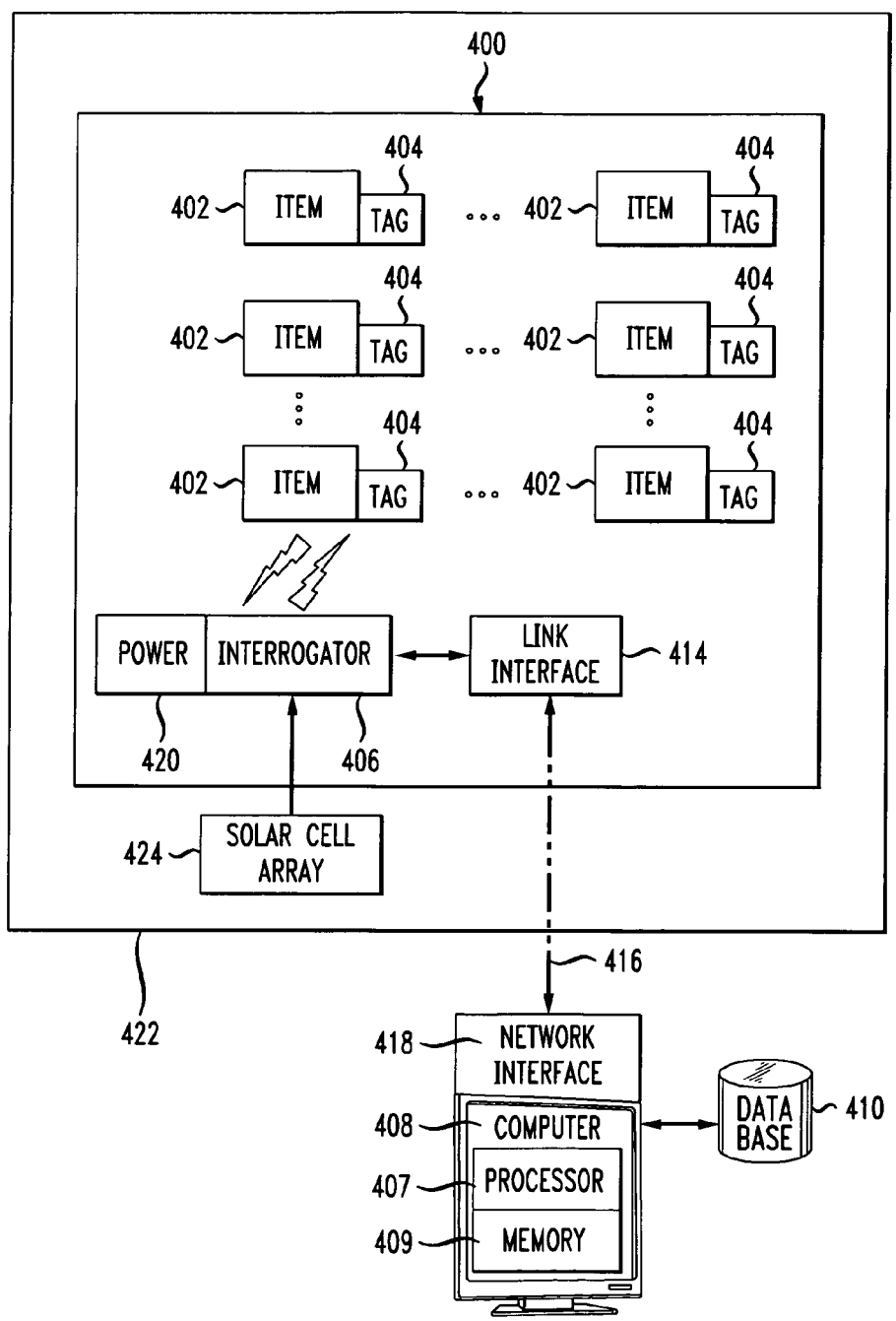
FIG. 4 is a schematic of a shipping container containing an internally disposed interrogator communicating with a computer over a wired or wireless link in accordance with an aspect of the invention.

FIG. 4 is a schematic of an illustrative embodiment of a system similar to that of FIG. 1, including a containerized shipment comprising a container 400 in which a plurality of items 402 for shipment are contained. Each item 402 has an associated identification tag 404 which uniquely identifies the item 402 as described in the foregoing. In this expedient, an interrogator 406 is disposed within the container 400 and operably coupled to a link interface 414, which enables communication through either a wired or wireless connection (collectively referred to by the reference numeral 416) to a computer 408 via an appropriate network interface 418. The computer 408 includes a processor 409 and memory 411, and is coupled to a database 412 and operates as described above. As will be appreciated by those skilled in the art, a wired connection 416 between the interrogator 406 and computer 408 may comprise, for example. Ethernet, USB, RS-232 and the like. In such a case, the wired connection physically passes through a wall of the container 400. If desired, such a wired connection can also be utilized to provide a source of power to interrogator 406. Alternatively, a wireless connection can be established between interrogator 406 and computer 408 using known technologies such as Wi-Fi, Bluetooth, Zigbee and the like. In this regard, an antenna (not shown) can be installed on an exterior face of the container 400 to enable the transmission and receipt of wireless communications as is well known in the art. For a wireless expedient, the interrogator 406 may be self powered by a power source denoted generally at 420. Since such containers are typically transported on a conveyance such as a ship 422, power source 420 may be a wave-motion activated dynamo contained either within or external to container 400. Alternatively, a solar cell array 424 can be mounted on an exposed surface of container 400, or on a deck of ship 422 and coupled to interrogator 406 using conventional hardware. In yet another embodiment, the interrogator 406 can be coupled to any other source of power on ship 422. The use of an internally disposed interrogator 406 enables personnel to inventory the container 400 without having to open the same or unload it from the ship 422, since such containers 400 are generally stacked with the ends thereof being readily accessible. For a wireless implementation, a medium range (20-30 meters) wireless connection such as Wi-Fi can advantageously enable the container 400 to be inspected while the ship 422 is still at sea, thereby eliminating the need for personnel to physically board the ship. The range of the wireless connection can be increased through the use of high-gain directional antennas, or by commercially available proprietary long-range (several kilometers) radio links. Alternatively, a satellite link between the interrogator 406 and computer 408 can be employed to provide essentially unlimited range and on-demand monitoring. In this regard, such long-range communications can utilize end-to-end encryption (such as SSL/TLS or IPSec) beyond any link-level encryption provided by the hardware.

While an illustrative embodiment has been shown and described with respect to containers that are transported by ship, it will be appreciated by those skilled in the art that the invention is equally applicable to other transportation scenarios where a number of small items are combined in a large container, such as for example, boxes disposed in a truck, truck trailer, or railroad car; baggage or cargo carried on aircraft; or even for checking passengers on airplanes where such RFID tags are incorporated into boarding passes.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. An identification tag that is vulnerable to a radiation, comprising:
    a transceiver having a modulator for receiving a radio frequency signal and transmitting a modulated radio frequency signal;
    a first memory containing a first code for generating the modulated radio frequency signal, the first code being associated with an object for identification; and
    a second memory containing a second code corresponding to a unique identifier for identifying the identification tag for further modulating the radio frequency signal that is received, the second memory being specifically vulnerable to the radiation such that a presence of the radiation alters the second code, wherein a degree of alteration of the second code is proportional to a radiation flux of the radiation, wherein a position of a source of the radiation is determined using a spatial location of the identification tag and the radiation flux.

2. The identification tag recited in claim 1, wherein the second memory comprises an electronically erasable programmable read-only memory.

3. The identification tag recited in claim 1, wherein data corresponding to the code stored in the second memory is not subjected to error correction.

4. The identification tag recited in claim 1, wherein the identification tag is powered by energy in the radio frequency signal that is received.

5. The identification tag recited in claim 1, wherein the identification tag further comprises a power source coupled to the transceiver.

6. The identification tag recited in claim 1, wherein the unique identifier is a serial number for the identification tag.

7. A system for detecting a presence of a radiation in a cargo container housing a plurality of objects, wherein a plurality of identification tags is associated with the plurality of objects, each identification tag including a memory vulnerable to the radiation, the memory containing a code corresponding to a unique identifier for identifying each tag, comprising:
an interrogator for interrogating the identification tags with a radio frequency signal and receiving a modulated radio frequency signal;
a database adapted to store the unique identifier for each identification tag; and
a processor adapted to communicate with the database and the interrogator for detecting and comparing the code stored in the memory of each identification tag with the unique identifier stored in the database such that the presence of the radiation alters the code, wherein a degree of alteration of the code is proportional to a radiation flux of the radiation, wherein a position of a source of the radiation is determined using a spatial location of each one of the identification tags and the radiation flux.

8. The system recited in claim 7, wherein the processor is coupled to an alarm for indicating the presence of the radiation when the code of any identification tag among the plurality of identification tags does not match the unique identifier for the identification tag stored in the database.

9. The system recited in claim 8, wherein the processor is coupled to an apparatus for recording the spatial location of each identification tag within the cargo container.

10. The system recited in claim 7, wherein the unique identifier stored in the database for each identification tag is a serial number of the identification tag.

11. The system recited in claim 7, wherein the interrogator is disposed within the cargo container, and processor is disposed external to the cargo container, the interrogator communicating with the processor over one of: a wired communications link and a wireless communications link.

12. The system recited in claim 11, wherein the wired link is one of: an ethernet link, a universal serial bus link and a recommended standard 232 link.

13. The system recited in claim 11, wherein the wireless link is one of: a wireless-fidelity link, a bluetooth link and a zigbee link.

14. The system recited in claim 11, wherein the wireless link between the interrogator and the processor includes a satellite link.

15. A method for detecting a presence of a radiation through an identification tag, the identification tag including a memory vulnerable to the radiation, the memory being programmed to store a code corresponding to a unique identifier for identifying the identification tag, comprising:
interrogating the identification tag with a radio frequency signal and receiving a modulated radio frequency signal;
detecting and comparing the code stored in the memory of the identification tag with a unique identifier stored in a database such that the presence of the radiation alters the code, wherein a degree of alteration of the code is proportional to a radiation flux of the radiation, wherein a position of a source of the radiation is determined using a spatial location of the identification tag and the radiation flux; and
issuing a radiation alarm if the code initially stored in the memory of the identification tag does not match the unique identifier for the identification tag stored in the database.

16. The method recited in claim 15, wherein a cargo container houses a plurality of objects and a plurality of identification tags is associated with the plurality of objects and a modulator for interrogating the plurality of identification tags with the radio frequency signal and receiving the modulated radio frequency signal is disposed within the cargo container, and the method further comprises receiving the modulated radio frequency signal over a wireless link at a computer for detecting and comparing the code stored in the memory of each identification tag with the unique identifier for the identification tag stored in the database.

17. The method recited in claim 16, wherein the wireless link is one of: a wireless-fidelity link, a bluetooth link and a zigbee link.

18. The method recited in claim 16, wherein the wireless link includes a satellite link.

* * * * *